(12) United States Patent
Poulakis et al.

(10) Patent No.: US 7,842,368 B1
(45) Date of Patent: Nov. 30, 2010

(54) METHOD FOR PRODUCING A SHAPED FOAM BODY, ESPECIALLY A FOAM PADDING ELEMENT FOR A VEHICLE SEAT

(75) Inventors: Konstantinos Poulakis, Pulsnitz (DE); Axel Schulte, Holzgerlingen (DE)

(73) Assignee: Gottlieb Binder GmbH & Co., Holzgerlingen (DE)

( * ) Notice: Subject to any disclaimer, the term of this patent is extended or adjusted under 35 U.S.C. 154(b) by 0 days.

(21) Appl. No.: 09/743,710

(22) PCT Filed: Aug. 3, 1998

(86) PCT No.: PCT/EP98/04832

§ 371 (c)(1),
(2), (4) Date: Jan. 16, 2001

(87) PCT Pub. No.: WO00/07792

PCT Pub. Date: Feb. 17, 2000

(51) Int. Cl.
*B32B 3/06* (2006.01)
(52) U.S. Cl. .......................... 428/100; 428/99
(58) Field of Classification Search .................. 428/99, 428/100; 429/99, 100
See application file for complete search history.

(56) References Cited

U.S. PATENT DOCUMENTS

| 5,422,156 A | * | 6/1995 | Billarant | ..................... 428/100 |
| 5,654,070 A | | 8/1997 | Billarant | ..................... 428/100 |

FOREIGN PATENT DOCUMENTS

WO        86/03164        6/1986

* cited by examiner

*Primary Examiner*—Jane Rhee
(74) *Attorney, Agent, or Firm*—Roylance, Abrams, Berdo & Goodman, LLP

(57) ABSTRACT

A method produces a shaped foam body, especially a foam padding unit for a vehicle seat. At least one adhesive closure with adhesive elements is housed in a recess of a foaming mold used for producing the shaped foam body and is covered with a covering element inhibiting foaming. The covering element is placed on the side opposite to the adhesive elements to extend from the recess over a predetermined width, and is maintained by a holding device, while being removably held against the parts of the foaming mold which surround the recess.

11 Claims, 4 Drawing Sheets

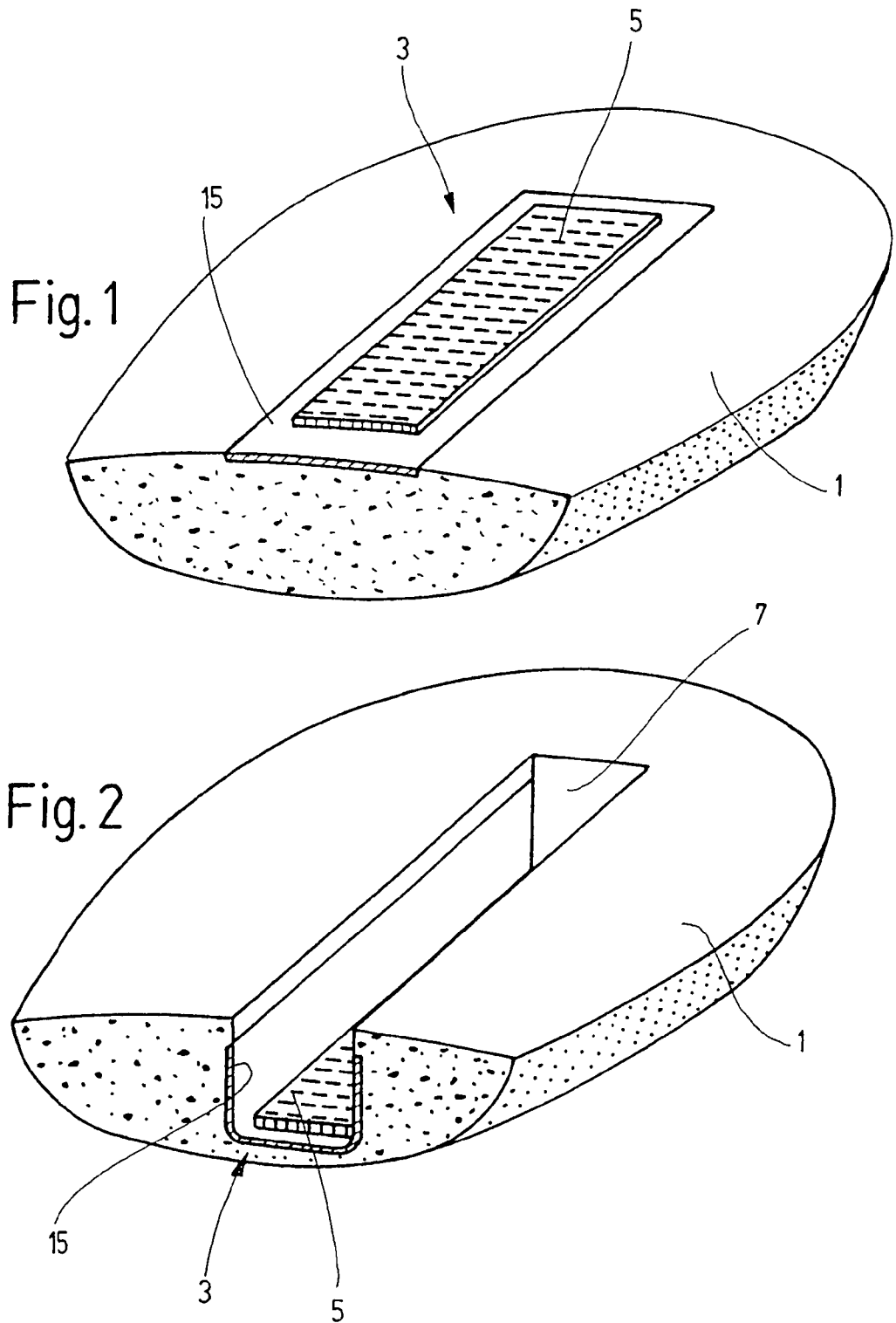

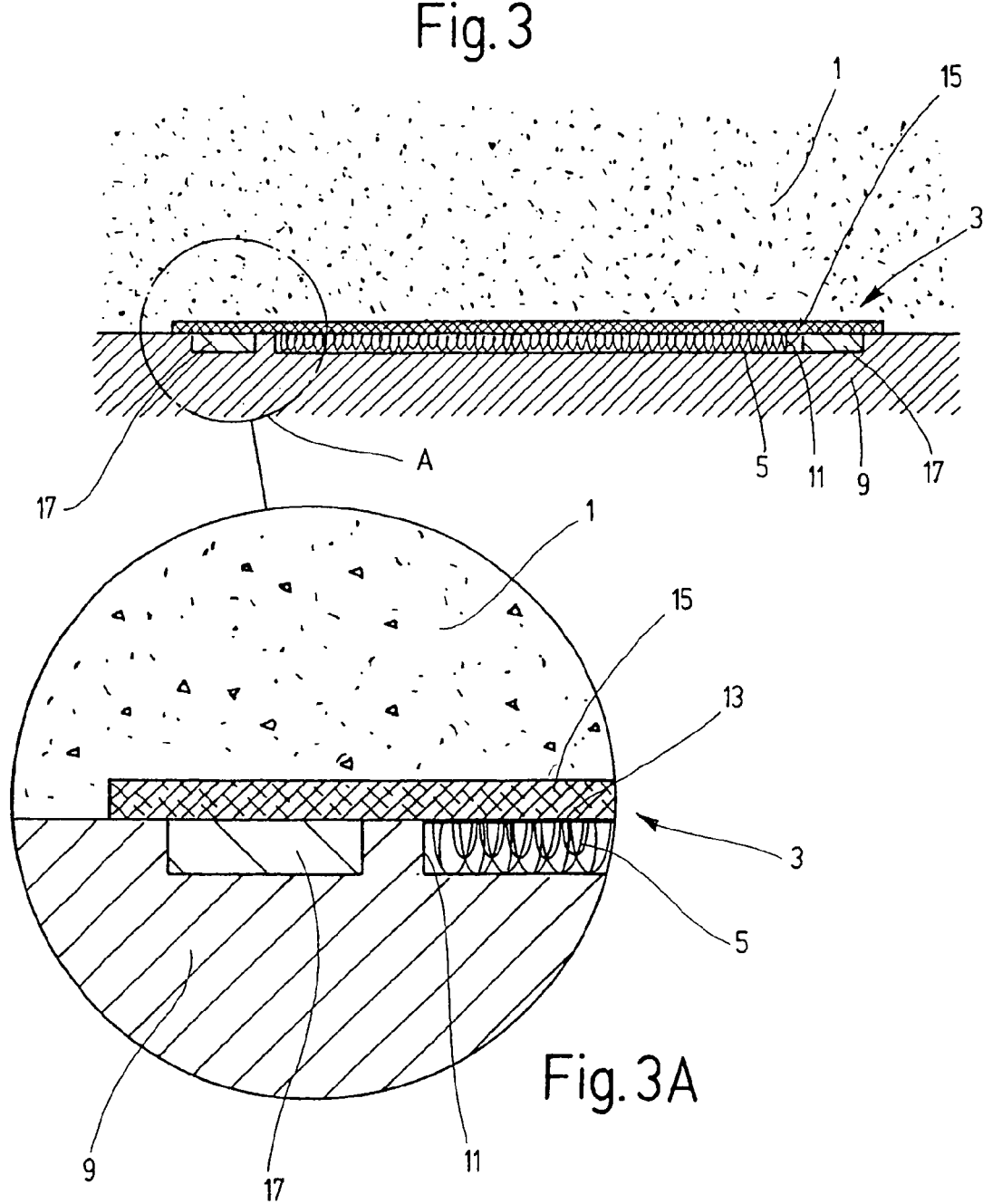

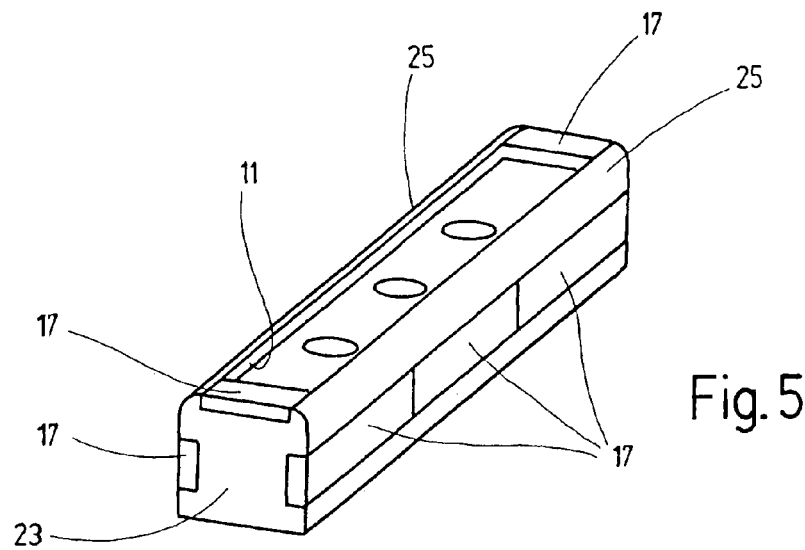
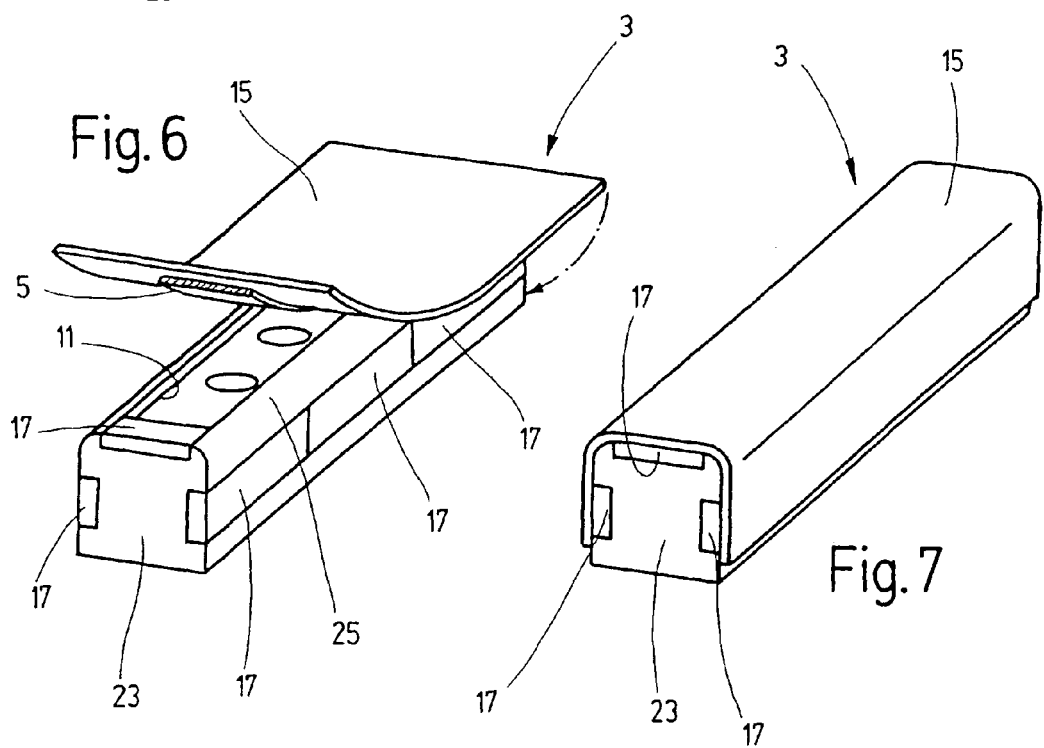

US 7,842,368 B1

METHOD FOR PRODUCING A SHAPED FOAM BODY, ESPECIALLY A FOAM PADDING ELEMENT FOR A VEHICLE SEAT

FIELD OF THE INVENTION

The present invention relates to a method for producing a foam body part, especially a foam padding element for a vehicle seat with at least one adhesive closing part with adhering elements. The adhesive closing part is arranged in a foaming mold producing the foam body part in such a manner that the adhering elements are protected against the penetration of foam by a foam-inhibiting covering. The covering is arranged on the side of the adhesive closing part opposite the adhering elements with a predetermined border width overlapping the surface area of the adhering elements, and releasably contacts parts of the foaming mold by a magnetic holding device. The covering is provided with ferromagnetic component parts and at least one permanent magnet is provided on the foaming mold.

BACKGROUND OF THE INVENTION

One method of producing a foam body part with an adhesive closing part is disclosed in WO-A-86 03164. One drawback with this method is that the adhering elements of the adhesive closing part are not securely protected by the foam-inhibiting covering against a penetration of foam material. To guarantee the capacity of the adhesive closing parts to function, however, it is essential during the foaming process that adherence of the adhesive elements to each other by penetrating foam material be avoided.

SUMMARY OF THE INVENTION

The method of the present invention facilitates the production of shaped foam bodies with adhesive closing parts foamed into the foam in an especially secure manner. Particularly, the risk of foam material penetrating into the area of adhering elements leading to an adherence of the same is avoided.

The foregoing objects are basically obtained by a method for producing a foam body part having at least one adhesive closing part with adhering elements, comprising the steps of: arranging an adhesive closing part in a foaming mold for foaming a foamed body part; protecting adhering elements on the adhesive closing part against penetration of foam by arranging a foam-inhibiting covering on a side of the adhesive closing part opposite the adhering elements, the foam-inhibiting covering having a predetermined border width overlapping and extending beyond a surface area of the adhering elements; and bringing the foam-inhibiting covering into detachable contact with parts of the foaming mold by permanent magnets in parts of the foaming mold attracting a ferromagnetic coating extending throughout the entire foam-inhibiting covering, the permanent magnets being layered to cooperate with the border of the covering overlapping the surface area of the adhering elements.

According to the present invention, the covering is provided with a ferromagnetic coating and permanent magnets are used on the foaming mold. The magnets can be provided a layered arrangement to cooperate with the borders of the covering overlapping the surface area incorporating the adhering elements.

In an advantageous manner, the covering border surrounding the area of the adhering elements is held in border areas by effective magnetic forces in tight, sealing contact on the foaming mold. The sealing effect is guaranteed directly on those border areas endangered by penetration of foam material.

With one method disclosed in U.S. Pat. No. 5,654,070 for the foaming of adhesive closing parts on foam body parts, the arrangement of permanent magnets on the foaming mold is along the side borders of the adhesive closing parts. With this method, however, adhesive closing parts are used without any ferromagnetic component parts. Instead, with this method special, flexible plastic strips are provided as side sealing strips, which contain a magnetically attractable material in powder form. On the basis of the required precisely adapted application of these special sealing strips, the execution of this method is costly and not cost-effective.

Preferably, with the method of the present invention, the adhering elements are held during the foaming process in a recess worked in the shaping wall of the foaming mold. Over its borders, the covering overlaps with a predetermined border width sealing off the foam. The recess is brought into contact with the border areas by means of the holding device.

The covering can be provided with a ferromagnetic coating of polyurethane, as is commercially available under the name SU-9182 from Firma Stahl and contains mixed-in Fe particles of granular size less than $10\mu$ as ferromagnetic material.

As part of the magnetic holding device associated with the foaming mold, the permanent magnets can be in the form of a series of magnetic rods or magnetic strips, which surround the recess formed in the wall of the foaming mold. The recess holds the adhering elements of the adhesive closing part to be inserted in the foam.

Another object is an adhesive closing part which can be foamed into a foam body part, which has a covering formed of felt or fleece.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a diagrammatically simplified, perspective view of a foam padding element with adhesive closing part in the foam, seen in perspective view from the end formed according to one embodiment of the present invention;

FIG. 2 is a diagrammatically simplified, perspective view of a foam padding element with an adhesive closing part inserted in a recess in the foam formed according to another embodiment of the present invention;

FIG. 3 is a partial, enlarged side elevational view in section of an adhesive closing part inserted in a foaming mold;

FIG. 3A is a greatly enlarged side elevational view in section of the area A of FIG. 3;

FIG. 5 is a diagrammatically simplified, perspective view of a mold part which can be inserted into a foaming mold to form a blowhole or channel in the foam; and FIGS. 6 and 7 are perspective views of the mold part of FIG. 5, with the adhesive closing part partially and completely engaged thereon, respectively.

DETAILED DESCRIPTION OF THE INVENTION

Figure 4:
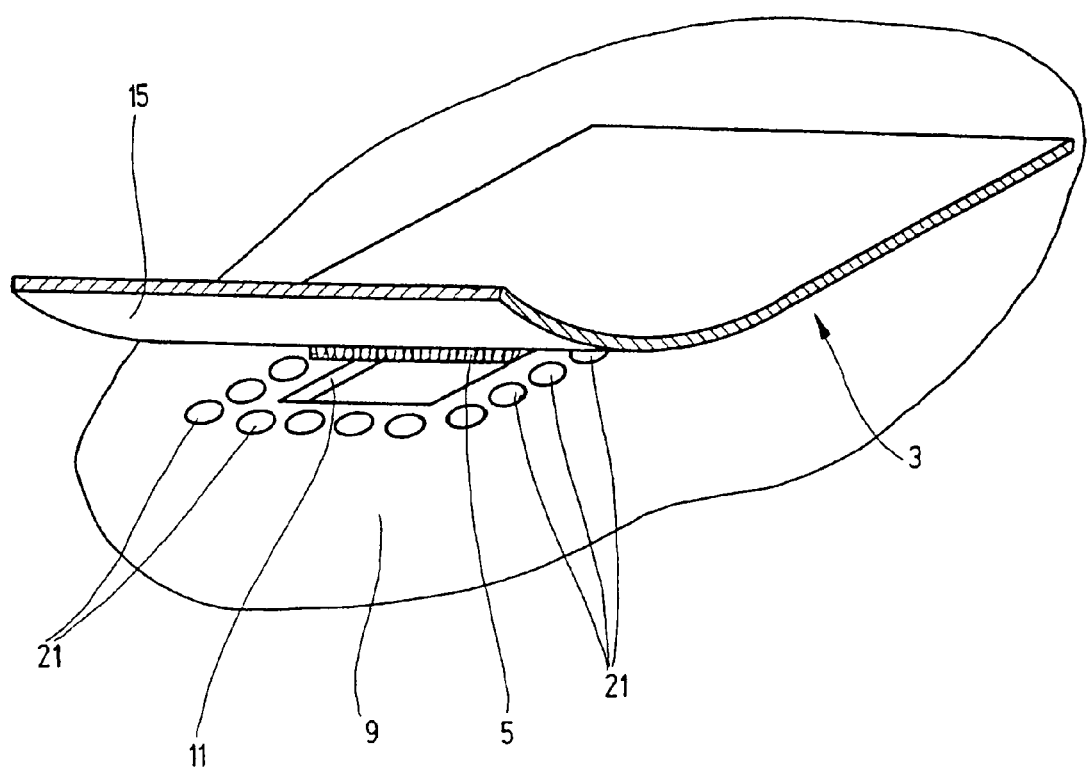
FIG. 4 is a perspective view of a cutout of a foaming mold with an inserted adhesive closing part.

FIG. 1 shows a part of a foam padding element having on its surface, an adhesive closing part 3 in the foam and flush therewith. On its frontal or catching side, adhesive closing part 3 incorporates adhering elements 5, which in a known manner can be configured for example in the shape of loops or tie loops, as can be seen in FIGS. 3 and 3A. Adhering elements 5 can also be mushroom-shaped or hook-shaped and can serve for catching and adhering with corresponding adhering elements of a body to be mounted on foam padding element 1, this body for example a slipcover.

In the example of FIG. 2, adhesive closing part 3 is embedded in the foam in a recess 7 of foam padding element 1. Thus, the adhering elements 5 of this embodiment are arranged not flush with the surface.

FIGS. 3 and 4 clearly show the foaming-in or molding-in of adhesive closing part 3 in an arrangement extending flush with the surface of foam padding element 1. In this case, a foaming mold used has a shaping wall 9 with a recess 11 in the area of the adhesive closing part 3. The recess is adapted to the surface area of adhering elements 5 of adhesive closing part 3. With engagement of the adhesive closing part on wall 9 of the foaming mold, adhering elements 5 are received in recess 11. As shown in detail in FIG. 3A, adhering elements 5 are connected by an adhesive layer 13 forming a tight adherence with a covering element 15 laid out as a thin lamina on adhesive layer 13. The adhesive material provides a good binding of the foam material with, for example a fleece or a felt. Covering element 15 extends outwardly, with its outer border areas over the surface area of adhering elements 5 and recess 11 constructed in wall 9 of the foaming mold. The overlapping border width of covering element 15 is selected to be such that the border areas overlap the permanent magnets, which are illustrated in FIGS. 3 and 3A, as magnetic strips 17. Covering element 15 is provided with a ferromagnetic coating, for example a polyurethane coating with added Fe particles. The ferromagnetic properties are ceded to covering element 15, so that the border areas adhere detachably to magnetic strips 17. This contact of the border areas of covering element 15, around the area of the adhering elements 5 held in the recess 11 of wall 9, forms a foam seal. During the foaming process, this foam seal prohibits any penetration of the foam material into adhering elements 5.

The tight connection of adhering elements 5 with covering element 15, varying from the diagrammatic representation of FIG. 3A, can also occur directly through a polyurethane coating containing ferromagnetic substances. Such coating can be for example the polyurethane SU-9182 of Stahl Holland B.V. of Waalwijk Holland, the subject matter of which is hereby incorporated by reference. Alternatively, an additional adhesive layer 13 can be provided on the ferromagnetic coating, for example a layer of a moisture-crosslinking polyurethane, for example Tivomelt 9617-11 of Firma Tivoli. As another possibility, the construction of covering element 15 in the form of an adhesive base layer directly supporting adhering elements 5 can be considered, for example, an adhesive base layer which contains synthetic resin or polyurethane together with ferromagnetic substances.

FIG. 4 shows the use of a plurality of magnetic rods 21 instead of the magnetic strips 17 shown in FIGS. 3 and 3A. Magnetic rods 21 in FIG. 4 are arranged in a ring around recess 11 in wall 9 of the foaming mold in such a manner that the edges of the ferromagnetic covering element 15 are held to wall 9 in sealed contact.

FIGS. 5 to 7 show, in detail, the process of the so-called blowhole or channel formation in the foam. Adhesive closing part 3 is set into recess 7 of the relevant foam padding part 1. For this purpose, a mold part 23 is used which can be anchored to wall 9 of the foaming mold. Recess 11 is provided in the mold part surface to receive and protect the adhering elements 5 of the relevant adhesive closing part 3. On the narrow ends of recess 11, magnetic strips 17 are provided for the contact of the narrow side border areas of ferromagnetic covering element 15. As shown in FIGS. 6 and 7, its longitudinal side border areas are fitted around the rounded edges 25 of mold part 23, in order to come into foam-sealing contact with side magnetic strips 17.

While various embodiments have been chose to illustrate the invention, it will be understood by those skilled in the art that various changes and modifications can be made therein without departing from the scope of the invention as defined in the appended claims.

The invention claimed is:

1. A method for producing a foam body part having at least one adhesive closing part with adhering elements, comprising the steps of:
   arranging an adhesive closing part in a foaming mold for forming a foamed body part, the adhesive closing part having first and second opposite surfaces and having adhering elements extending from said first surface;
   protecting the adhering elements on the adhesive closing part against penetration of foam by arranging a foam-inhibiting covering on said second surface of the adhesive closing part to be remote from the adhering elements, the foam-inhibiting covering having a predetermined peripheral border width overlapping and extending beyond a surface area of the adhering elements; and
   bringing the foam-inhibiting covering into detachable contact with parts of the foaming mold by permanent magnets in parts of the foaming mold attracting a ferromagnetic coating with ferromagnetic substances admixed therein extending on the foam-inhibiting covering, the permanent magnets being placed laterally about a periphery of a portion of the foaming mold receiving the adhering elements of the adhesive closing part to cooperate with the peripheral border of the covering overlapping the surface area of the adhering elements.

2. A method according to claim 1 wherein
the ferromagnetic coating is polyurethane with added iron particles.

3. A method according to claim 2 wherein
an adhesive layer connects the covering element to the adhesive closing part.

4. A method according to claim 1 wherein
the foam-inhibiting covering has a synthetic resin layer and a layer containing ferromagnetic substances, and forms an adhesive base of the adhesive closing part.

5. A method according to claim 4 wherein
the synthetic resin layer is a polyurethane layer.

6. A method according to claim 1 wherein
the foam-inhibiting covering comprises a piece of felt laid in a lamina on the adhesive closing part.

7. A method according to claim 1 wherein
the foam-inhibiting covering comprises a fleece laid in a lamina on the adhesive closing part.

8. A method according to claim 1 wherein
the adhering elements are received in a recess in the foaming mold; and
the border of the foam-inhibiting covering overlaps the recess.

9. A method according to claim 1 wherein
to form the foam body part with a channel within which the adhesive closing part is received, the adhesive closing part is received in a recess in a mold part entirely inserted in the foaming mold; and permanent magnets on the mold part hold the foam-inhibiting covering with the border of the covering overlapping the recess during a foaming process.

10. A method according to claim 1 wherein a foam body part is formed in the foaming mold with the adhesive closing part inserted in the foamed body part;

the adhesive closing part forms part of a holder for releasable contact thereof on the foaming mold; and the foam-inhibiting covering has a fleece or felt laminate on the adhesive closing part.

11. A method for producing a foam body part having at least one adhesive closing part with adhering elements, comprising the steps of arranging an adhesive closing part in a foaming mold for forming a foamed body part, the adhesive closing part having first and second opposite surfaces and having adhering elements extending from said first surface;

protecting the adhering elements on the adhesive closing part against penetration of foam by arranging a foam-inhibiting covering said second surface of the adhesive closing part to be remote from the adhering elements, the foam-inhibiting covering having a predetermined peripheral border width overlapping and extending beyond a surface area of the adhering elements and having a felt or fleece lamina thereon; and bringing the foam-inhibiting covering into detachable contact with parts of the foaming mold by permanent magnets in parts of the foaming mold attracting a ferromagnetic coating on the foam-inhibiting covering, the permanent magnets being placed laterally about a periphery of a portion of the mold receiving the adhering elements of the adhesive closing part to cooperate with the peripheral border of the covering overlapping the surface area of the adhering elements.

* * * * *